(12) United States Patent
Prochnow

(10) Patent No.: US 10,900,184 B1
(45) Date of Patent: Jan. 26, 2021

(54) DISTRIBUTION OF DEICING AND ANTI-ICING AGENTS

(71) Applicant: Eric Prochnow, Bloomington, IL (US)

(72) Inventor: Eric Prochnow, Bloomington, IL (US)

(*) Notice: Subject to any disclaimer, the term of this patent is extended or adjusted under 35 U.S.C. 154(b) by 213 days.

(21) Appl. No.: 15/078,950

(22) Filed: Mar. 23, 2016

Related U.S. Application Data

(63) Continuation-in-part of application No. 13/762,809, filed on Feb. 8, 2013, now abandoned.

(51) Int. Cl.
*E01H 10/00* (2006.01)
*B65G 65/30* (2006.01)

(52) U.S. Cl.
CPC .......... *E01H 10/007* (2013.01); *B65G 65/30* (2013.01)

(58) Field of Classification Search
CPC ........ B65G 65/30; B65G 65/32; B65G 65/34; B65G 65/425; E01H 10/007
See application file for complete search history.

(56) References Cited

U.S. PATENT DOCUMENTS

| | | | | |
|---|---|---|---|---|
| 2,168,495 A | * | 8/1939 | Rasmussen | B28C 7/161 294/68.26 |
| 2,432,437 A | * | 12/1947 | Murphy | A01C 7/087 222/268 |
| 3,123,107 A | * | 3/1964 | Kappler | B65D 90/626 141/284 |
| 3,198,395 A | * | 8/1965 | McKinney | B65D 88/56 141/284 |
| 3,224,653 A | * | 12/1965 | Cooke | B65D 88/56 222/166 |
| 3,469,742 A | * | 9/1969 | Kavanaugh | B01F 13/1002 222/132 |
| 3,930,258 A | * | 12/1975 | Dick | B41J 2/175 137/408 |

(Continued)

FOREIGN PATENT DOCUMENTS

WO   WO 2013/044326   *   9/2011   ............. B65B 69/00

*Primary Examiner* — Saul Rodriguez
*Assistant Examiner* — Ashley K Romano
(74) *Attorney, Agent, or Firm* — Singleton Law Firm, P.C.

(57) ABSTRACT

Embodiments of the invention provide a method for delivering a supply of one or more deicing and anti-icing agents for localized seasonal storage and application at a facility. In advance of a winter season, a deicing agent or anti-icing agent according to embodiments of the present invention may be provided by a provider to a receiver in a delivery quantity for storage at a localized storage location at a facility. A deicing agent may be a salt compound treated with an additive which reduces bridging of salt granules. The provider may provide multiple storage containers each filled with a delivery quantity of anti-icing agent and may provide multiple storage containers each filled with a delivery quantity of deicing agent to a receiver, as well as one or more delivery stations. After receipt of an initial quantity of a deicing agent or anti-icing agent, the receiver may deploy a delivery station and set up a storage container with the delivery station. The receiver may move a sprayer unit or a spreader unit to the delivery station for filling. Upon depletion of some or all of the contents of an anti-icing container or the contents of a deicing container, the receiver may contact the provider to request that the provider replenish the anti-icing agent or the deicing agent.

14 Claims, 12 Drawing Sheets

(56) References Cited

U.S. PATENT DOCUMENTS

| | | | | |
|---|---|---|---|---|
| 3,998,362 | A * | 12/1976 | Lapierre | B65D 88/56 222/185.1 |
| 4,343,416 | A * | 8/1982 | Etheredge | G21F 5/002 222/1 |
| 4,524,886 | A * | 6/1985 | Wilson | B65G 47/19 222/58 |
| 4,571,143 | A * | 2/1986 | Hellerich | B65D 88/30 410/68 |
| 5,105,991 | A * | 4/1992 | Johnson | A47F 1/03 222/156 |
| 5,339,996 | A * | 8/1994 | Dubbert | B28C 7/0046 182/186.6 |
| 5,624,225 | A * | 4/1997 | Cox | B60P 1/6427 414/495 |
| 5,743,701 | A * | 4/1998 | Green | B60P 1/04 296/164 |
| 6,071,062 | A * | 6/2000 | Warhurst | B60P 1/6445 414/347 |
| 8,585,341 | B1 * | 11/2013 | Oren | B65G 65/42 222/181.1 |
| 8,714,211 | B1 * | 5/2014 | Schaefer | B65B 39/003 141/10 |
| 8,919,395 | B2 * | 12/2014 | Green | B65D 50/00 141/360 |
| 9,758,082 | B2 * | 9/2017 | Eiden, III | B65G 65/42 |
| 9,834,373 | B2 * | 12/2017 | Oren | B65D 88/28 |
| 2004/0124260 | A1 * | 7/2004 | Ward | E01H 10/007 239/146 |
| 2004/0258508 | A1 * | 12/2004 | Jewell | B65B 1/06 414/328 |
| 2008/0277423 | A1 * | 11/2008 | Garton | B29C 41/06 222/185.1 |
| 2009/0129903 | A1 * | 5/2009 | Lyons, III | B60P 1/56 414/332 |
| 2010/0278621 | A1 * | 11/2010 | Redekop | B65D 88/30 414/523 |
| 2011/0100506 | A1 * | 5/2011 | Zabludovsky-Nerubay | B65D 75/5883 141/94 |
| 2011/0127178 | A1 * | 6/2011 | Claussen | B65D 88/26 206/216 |
| 2013/0209204 | A1 * | 8/2013 | Sheesley | B65D 88/30 414/288 |
| 2014/0083554 | A1 * | 3/2014 | Harris | B65D 88/32 141/1 |
| 2014/0363262 | A1 * | 12/2014 | Ballentine | B65B 69/00 414/412 |
| 2015/0181801 | A1 * | 7/2015 | Niemela | A01C 17/001 119/51.01 |
| 2015/0360856 | A1 * | 12/2015 | Oren | B65G 69/181 414/411 |
| 2018/0050864 | A1 * | 2/2018 | Oren | B65D 88/022 |
| 2018/0072491 | A1 * | 3/2018 | D'Agostino | B65D 88/30 |

* cited by examiner

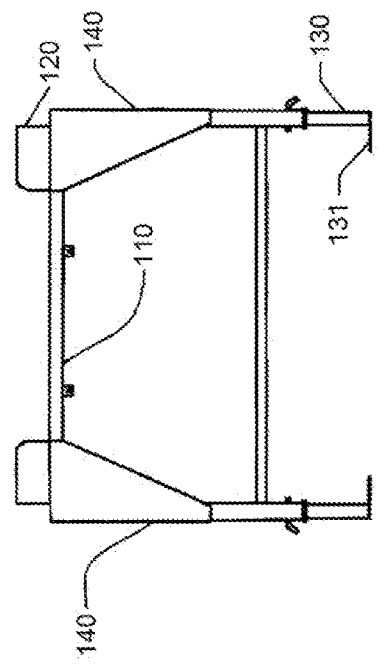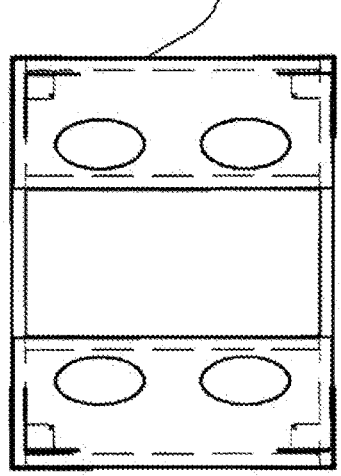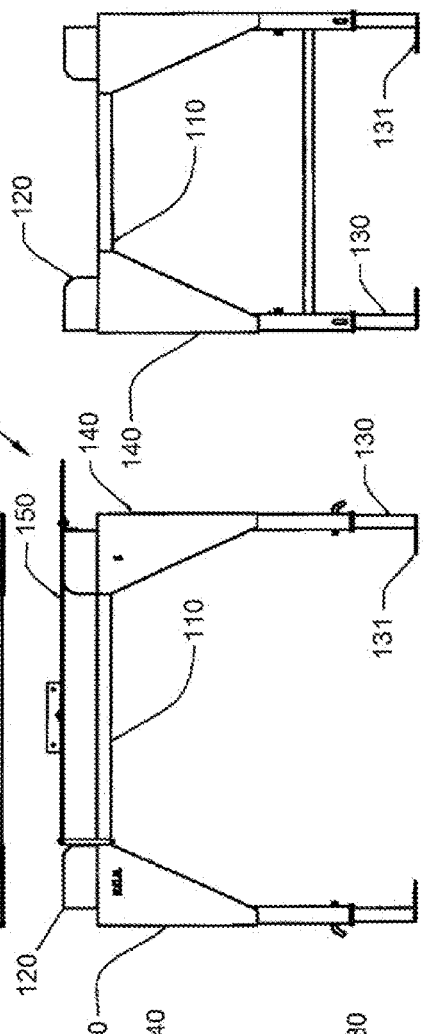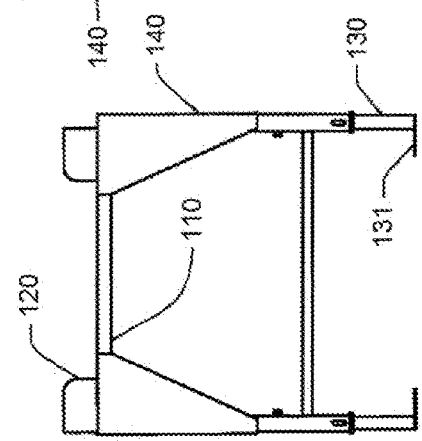

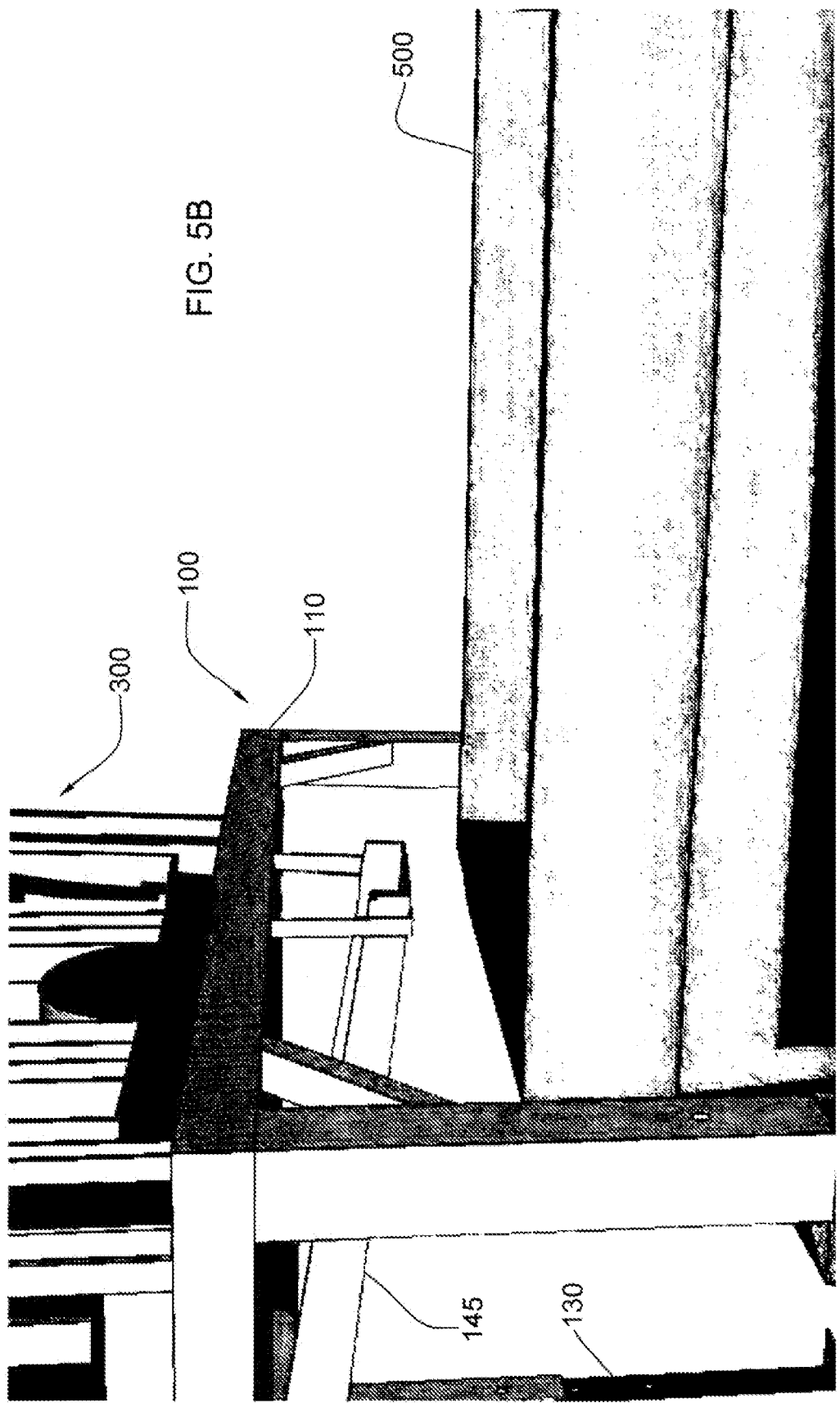

DISTRIBUTION OF DEICING AND ANTI-ICING AGENTS

CROSS-REFERENCE TO RELATED APPLICATIONS

The present application is a continuation-in-part of U.S. patent application Ser. No. 13/762,809, filed Feb. 8, 2013, which claims the benefit of U.S. Provisional Patent Application No. 61/596,368, filed Feb. 8, 2012. Each above-mentioned patent application is hereby incorporated by reference in its entirety.

BACKGROUND OF THE INVENTION

The present invention relates to distribution logistics and safety management. More particularly, the present invention provides a method for seasonal distribution of deicing and anti-icing agents for localized storage at facilities, while improving worker safety for facility personnel.

During the winter season, in order to prepare for severe winter storms, it is crucial for facilities to procure sufficient quantities of deicing and anti-icing agents well in advance. Yet established distribution methods are significantly cumbersome, and present elevated risk of injury and hazards for facility personnel responsible for transporting deicing and anti-icing agents. A facility is defined herein as a single building and its proximate ground areas such as sidewalks, parking lots, and access roads.

Conventionally, deicing agents, i.e., salt of various compositions, are stored and transported in large bags. The use of non-rigid containers is intended to alleviate the formation of large masses by conventional deicing salts that will occur when stored at rest for an extended period of time within a rigid container, known as "bridging." However, non-rigid containers, by nature, are more difficult to transport than rigid containers. Irregularly-shaped bags cannot be efficiently packed together for mass delivery, while at the same time the delivery of individual bags presents its own challenges. Most particularly, a bagged quantity of deicing agent conventionally sold to service one facility over one winter is generally sufficiently heavy—at approximately 50 pounds per bag—as to present a risk of occupational injury to personnel.

Furthermore, due to the delivery of bags in bulk, purchase of deicing agents is generally made at the end of the winter season, excess unused deicing agent cannot be readily transported, returned, or refilled. The process of supplying deicing agents is therefore inflexible and not conducive to efficient allocation of resources and risk management. There has not been a method for improved logistics in supplying deicing and anti-icing agents which addresses these known difficulties in transportation, storage, and safety.

BRIEF SUMMARY OF THE INVENTION

Embodiments of the invention provide a method for delivering a supply of one or more deicing and anti-icing agents for localized seasonal storage and application at a facility. A deicing agent according to embodiments of the present invention may be a salt compound which acts by known principles in the art to reduce the freezing point of water, and may be treated with an additive which reduces bridging of salt granules. An anti-icing agent according to embodiments of the present invention may be a fluid deicing agent which forms a coating by known principles in the art over exterior paved surfaces to prevent ice formation.

A provider and a receiver may enter into an agreement for the provider to deliver a quantity of a deicing agent, a quantity of an anti-icing agent, or a quantity of a deicing agent and a quantity of an anti-icing agent to a facility. In advance of a winter season, a deicing agent or anti-icing agent according to embodiments of the present invention may be provided by a provider to a receiver in a delivery quantity for storage at a localized storage location at a facility. To determine the delivery quantity to provide to the receiver in advance of a winter season, a provider may calculate a delivery quantity in accordance with one or more operational variables for a facility.

The provider may provide multiple storage containers each filled with a delivery quantity of anti-icing agent and may provide multiple storage containers each filled with a delivery quantity of deicing agent to a receiver. An anti-icing agent storage container according to embodiments of the present invention may have a valve opening through a side of the storage container. A deicing agent storage container according to embodiments of the present invention may have an outlet opening near the base of the storage container, and may have a door member covering the outlet of the storage container. A deicing agent storage container according to embodiments of the present invention may have an open top, and may further provide a lid which may cover the open top.

Additionally, a provider may provide one or more delivery stations to the receiver. A delivery station may include a dispensing lever mounted to a side of the delivery station and a chute member extending out from the same side. A delivery station and a storage container according to embodiments of the present invention may be provided to a receiver in a nesting configuration to reduce space occupied in transportation.

After receipt of an initial quantity of a deicing agent or anti-icing agent in one or more storage containers with one or more delivery stations by a receiver at a storage location, generally an outdoor common area, the receiver may deploy a delivery station and set up a storage container with the delivery station. A storage container may be lowered onto a delivery station. Prior to a forecasted snowstorm in the case of anti-icing agents, or following a snowstorm in the case of deicing agents, the receiver may move a sprayer unit or a spreader unit to the delivery station for filling. Once a sprayer or a spreader has been filled, the sprayer or spreader may be moved from the storage location to a paved surface at the facility.

Upon depletion of some or all of the contents of an anti-icing container or the contents of a deicing container, the receiver may contact the provider to request that the provider replenish the anti-icing agent or the deicing agent. A provider may arrive at the facility to measure the quantity of an anti-icing agent or a deicing agent depleted and transport a refill supply of an anti-icing agent or a deicing agent to the facility in a delivery vehicle. To replenish a supply of anti-icing agent or deicing agent, a storage container may be replaced or refilled by a provider.

BRIEF DESCRIPTION OF THE DRAWINGS

FIGS. 1A through 1D illustrate, respectively, front, left, right, and back elevation views of a delivery station according to an embodiment of the present invention. FIG. 1E illustrates a plan view of the delivery station of FIGS. 1A through 1D.

FIG. 5B illustrates an enlarged view of FIG. 5A, focusing on a chute member of the delivery station.

DETAILED DESCRIPTION OF THE INVENTION

Figure 2:
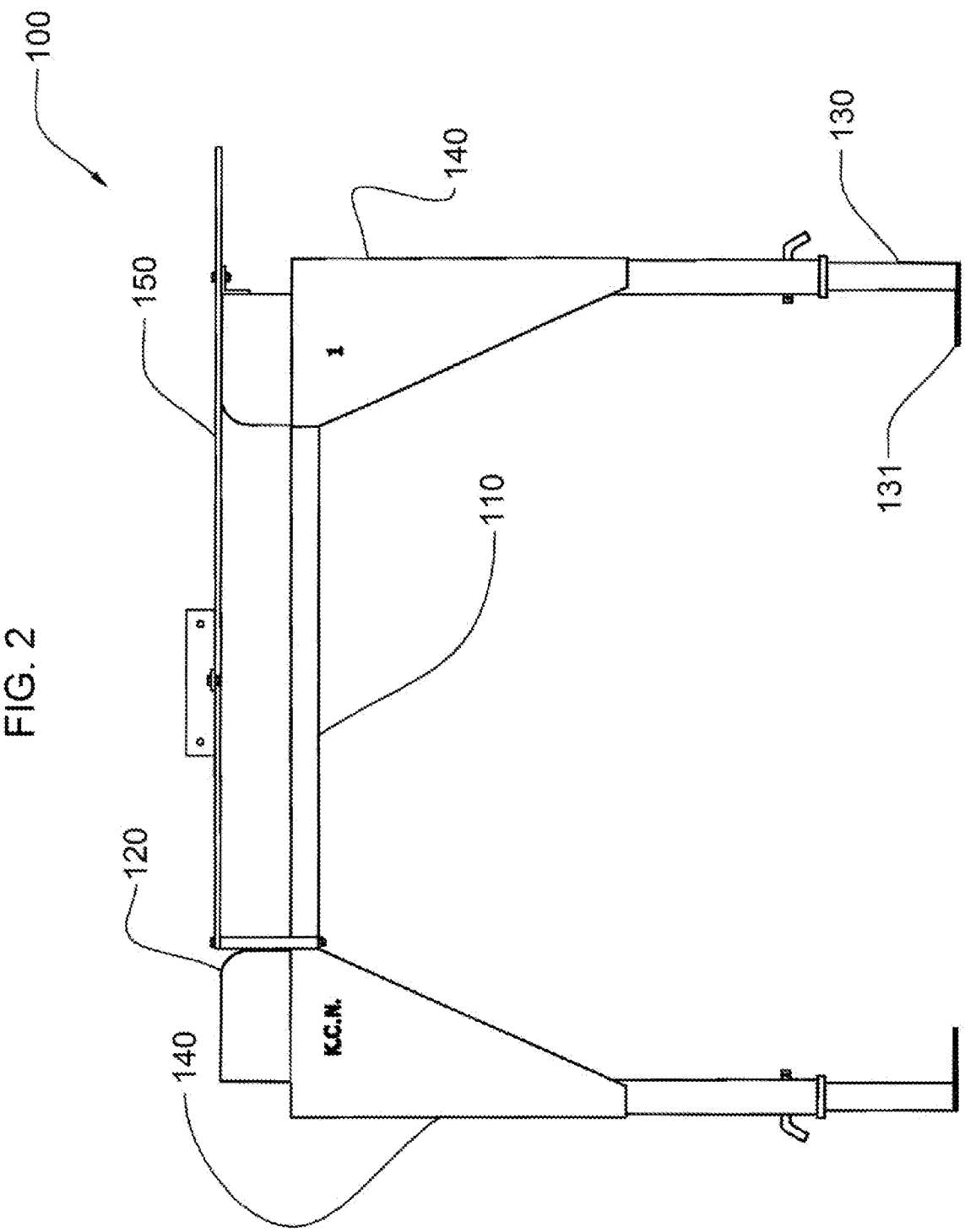
FIG. 2 illustrates a front elevation view of a delivery station according to an embodiment of the present invention.

Embodiments of the invention provide a method for delivering a supply of one or more deicing and anti-icing agents for localized seasonal storage and application at a facility. A facility refers to one or more commercial or institutional buildings in physical proximity where facility maintenance tasks are privately managed by a common entity. The definition of a facility in accordance with the present invention includes any and all privately owned and maintained exterior paved surfaces, including roads, parking lots, sidewalks, and all other areas and paths for vehicle and pedestrian access and traffic.

A deicing agent according to embodiments of the present invention may be a salt compound which acts by known principles in the art to reduce the freezing point of water. A deicing agent, alternately, may be a salt compound treated with an additive which reduces bridging of salt granules. An anti-icing agent according to embodiments of the present invention may be a fluid deicing agent which forms a coating by known principles in the art over exterior paved surfaces to prevent ice formation. An anti-icing agent may be, for example, a formulation of BIOMELT, a product sold by SNI Solutions, Inc. of Geneseo, Ill. as a standalone anti-icing agent. A deicing agent may be treated with, for example, a formulation of BIOMELT prepared as an additive component of a granular salt deicing agent.

According to embodiments of the present invention, a provider and a receiver may enter into an agreement for the provider to deliver a quantity of a deicing agent, a quantity of an anti-icing agent, or a quantity of a deicing agent and a quantity of an anti-icing agent to a facility where the receiver employs and directs personnel responsible for performance of winter maintenance tasks at the facility. The performance of facility maintenance tasks may include the application of anti-icing agents onto exterior paved surfaces at the facility to form a coating prior to an anticipated snowstorm to prevent ice formation on the exterior paved surfaces, and may include the application of deicing agents onto exterior paved surfaces at the facility following a snowstorm to reduce the melting point of accumulated snow.

In advance of a winter season, a deicing agent or anti-icing agent according to embodiments of the present invention may be provided by a provider to a receiver in a delivery quantity for storage at a localized storage location at a facility. The delivery of a deicing agent or an anti-icing agent to a receiver may be established by assessing the needs of the receiver for deicing agents or anti-icing agents. To determine the delivery quantity to provide to the receiver in advance of a winter season, a provider may calculate a delivery quantity in accordance with one or more operational variables for a facility.

An operational variable for a facility may be a daily application frequency, referring to a number of applications of anti-icing agents or deicing agents prescribed per day of snowfall for exterior paved surfaces located at a facility. A daily application frequency for a facility may be determined by factors such as the forecast snowfall timing and extent at the facility over a day, the area of exterior paved surfaces located at the facility, the amount of vehicle and pedestrian traffic over exterior paved surfaces located at the facility over a day, and the extent of heating received by exterior paved surfaces at the facility over a day.

An operational variable for a facility may be an application volume, referring to the total amount of anti-icing agents or deicing agents required for a single application covering substantially all exterior paved surfaces located at the facility.

An operational variable for a facility may be an application trip frequency, referring to a number of trips by which an application vehicle controlled by the receiver makes to a storage location in order to be filled with sufficient anti-icing agent or deicing agent to total an application volume.

An operational variable for a facility may be a past delivery quantity, referring to a quantity of anti-icing agents or deicing agents delivered to a facility during a previous winter season. A past delivery quantity may be measured in units of containers used to deliver anti-icing agents or deicing agents, such as a standard 50-pound bag as known by persons of ordinary skill in the art.

As an initial step of providing a delivery quantity of an anti-icing agent or a deicing agent to a receiver, a provider may provide a storage container to a receiver, where the storage container is filled with a delivery quantity of anti-icing agent. A provider may provide a storage container to a receiver, where the storage container is filled with a delivery quantity of deicing agent.

A delivery quantity may range from approximately forty to sixty 50-pound units. A lower delivery quantity may be selected in the case that the storage container is not refillable, to facilitate replacing a storage container. A higher delivery quantity may be selected in the case that the storage container is refillable, to improve the efficiency of trips made by a provider to subsequently replenish the contents of the storage container.

The provider may provide multiple storage containers each filled with a delivery quantity of anti-icing agent and may provide multiple storage containers each filled with a delivery quantity of deicing agent to a receiver. A provider may serve as a distributorship which engages in a rental or sales program to rent or sell one or more storage containers to a receiver over a winter season. A storage container 10 according to embodiments of the present invention may have a square or rectangular base. A base of a storage container according to embodiments of the present invention may have slots that receive fork lift forks inserted from any of the container's four sides.

An anti-icing agent storage container according to embodiments of the present invention may have a valve opening through a side of the storage container. The valve may be a tap or faucet as known by persons of ordinary skill in the art which may be opened and closed to control the dispensation of fluids from the storage container.

A deicing agent storage container according to embodiments of the present invention may have an outlet 30 opening near the base of the storage container, and may have a gate member 40 covering the outlet of the storage container. The gate member may be attached to a linkage member 45. If fastened to an external lever, the linkage member 45 may provide sufficient leverage to slide the gate member 40 outward to open the gate member 40 and uncover the outlet 30 when the external lever is pulled outward, and to close the gate member 40 and cover the outlet 30 when the external lever is pushed inward. The gate member 40 may provide no handles or other grasping points which provide sufficient leverage to slide the gate member 40 except for the linkage member 45 in conjunction with an external lever. While open, the gate member 40 may permit contents of the storage container 10 to exit through the outlet 30. While closed, the gate member 40 may block the outlet 30 such that contents of the storage container 10 cannot exit through the outlet.

A deicing agent storage container according to embodiments of the present invention may have an open top, and may further provide a lid 20 which may cover the open top. The lid 20 may be pivotably affixed to the storage container by one or more cradle mechanisms which permit the lid 20 to be opened by raising a side of the lid 20 from below. The side of the storage container by which the lid 20 may be raised may be referred to as its access side. Thus, the lid 20 may be lifted from below and to a side of the storage container without manipulation from above. In an opened configuration, the lid 20 may slide backwards and flip upwards away from the access side of the storage container.

A storage container provided to a receiver may be refillable or non-refillable. A refillable storage container may have its lid pivotably affixed to the storage container by cradle mechanisms. A non-refillable storage container may have its lid secured to the storage container by a lock which cannot be opened by the receiver.

Figure 7:
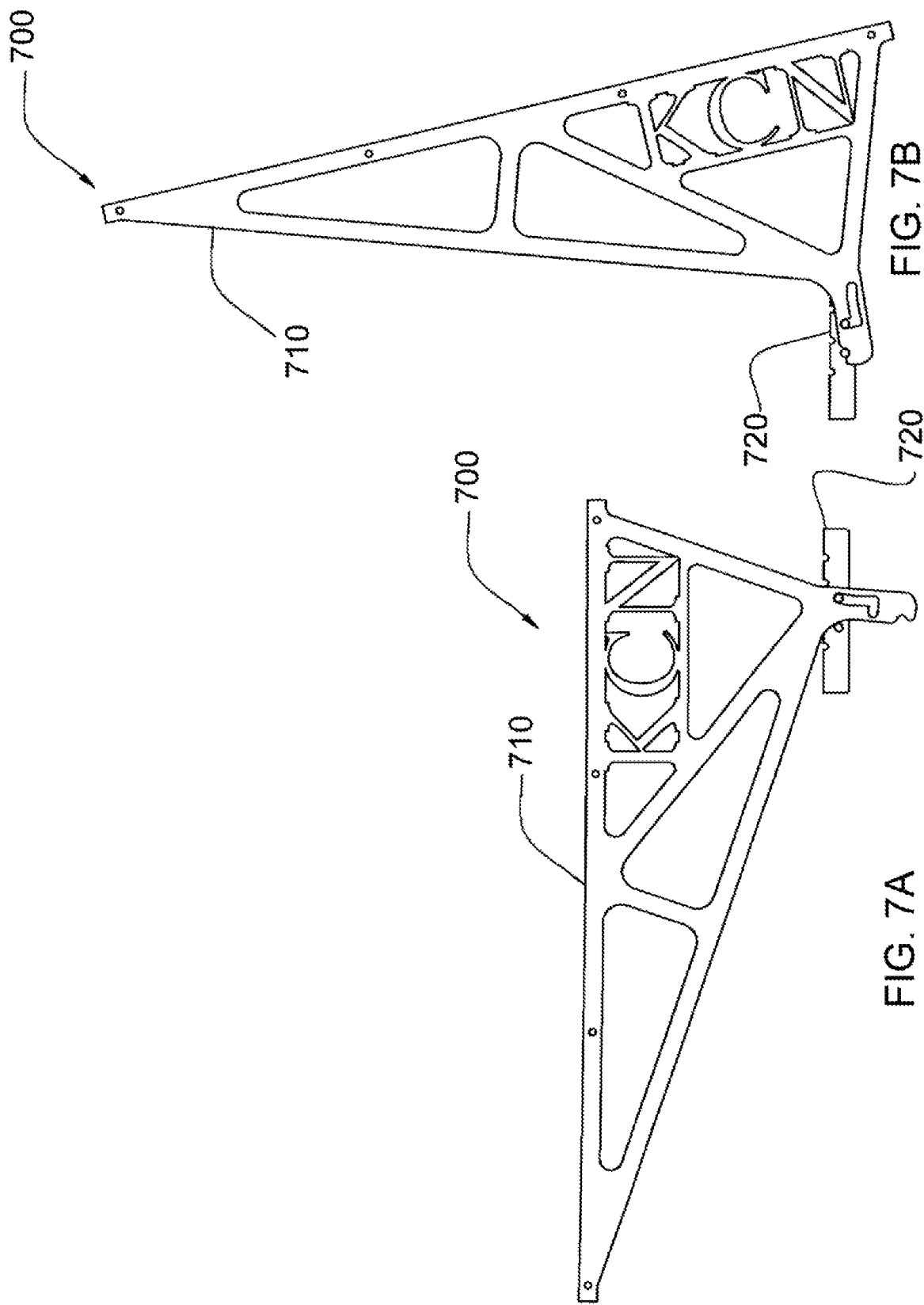
FIGS. 7A and 7B illustrate plan views of a cradle mechanism according to an embodiment of the present invention.

FIGS. 7A and 7B illustrate a cradle mechanism 700 according to an embodiment of the present invention. The cradle mechanism 700 includes a lid attachment frame 710 pivotably mounted to a hinge base 720 at one lengthwise end. Embodiments of the present invention may provide two cradle mechanisms, providing two hinge bases mounted to opposite sides of a storage container, and two corresponding lid attachment frames attached along opposite edges of a detached lid fitting the storage container. The lid may be lifted using a tool from the access side of the storage container to disengage it from the storage container, such that the lid attachment frames pivot to allow the container lid to clear the top of the bulk material container while remaining attached to the bulk material container by the hinge bases. According to embodiments of the present invention, the cradle mechanisms may facilitate the opening and closure of a lid of a storage container supported by a delivery station where the container and the delivery station have a combined height such that the container lid is beyond the reach of a human user.

Additionally, a provider may provide one or more delivery stations to the receiver. FIGS. 1A through 1E and 2 illustrate a delivery station 100 for use with a storage container, according to embodiments of the present invention. The delivery station 100 includes a main frame 110, a top portion of which constitutes a top frame 120, and legs 130; it may further include gussets 140 and a dispensing lever 150.

In an embodiment of the present invention according to FIGS. 1A through 1E and 2, a main frame 110 is constructed from 2×2×3/16 inch steel tubing. Other embodiments may provide a main frame constructed from other materials, such as plastic. A top frame 120 of the main frame 110 may be constructed from metal or plastic sheets forming a resting surface over the main frame 110, and metal or plastic sheets positioned at the four corners of the top frame 120 defining storage container brackets. The top frame 120 may receive a storage container lowered from above to fit within the storage container brackets, and may further provide lock receivers by which a lock may be affixed to both a storage container and the top frame 120. FIG. 1E is a plan view illustrating the resting surface and brackets of the top frame 120.

In an embodiment of the invention according to FIGS. 1A through 1E and 2, the brackets of the top frame 120 may be spaced to securely receive a storage container with a 56.5× 48 inch base, a storage container with a 48×45 inch base, or other suitable storage containers known to persons of ordinary skill in the art. Legs 130 may be adjustable to allow adjustment to uneven ground surfaces and raising and lowering the valve or outlet of a storage container used with the delivery station 100, depending on the desired destination delivery point. In an embodiment of the present invention according to FIGS. 1A through 1E and 2, a leg may be a telescoping tube constructed from a Drawtite receiver fabrication combo bar, Part #2853, may be used to make the height adjustment, and may further include a height fixing or locking mechanism.

The legs 130 may also include feet 131, as shown. These feet may include anchor holes for bolting the feet to the ground or floor, thus securing the delivery station 100 from theft as well as unwanted displacement during installation of a storage container, or due to accidental bumping, sliding, or continued vibratory action.

The feet 131 may be replaced with a wheeled base. A wheeled base may allow a delivering user to use the delivery station 100 to deliver bulk materials in a mobile fashion to multiple delivery points. An example is the delivery of seeds to several agricultural planters positioned apart from each other, performed by rolling the delivery station 100 between each filling location. A wheeled base may also allow a delivering user to wheel the delivery station 100 into an office, a mall, an industrial shop floor, a commercial kitchen, a hunting ground, an athletic field, or many other locations, to dispense the bulk materials where needed.

Gussets 140 may be attached between the legs 130 and the top frame 120 for additional strength and rigidity. In an embodiment of the present invention, gussets 140 may be 3/16 inch steel plates wrapped to fit the legs 130 and welded to the delivery station 100.

In an embodiment of the present invention according to FIGS. 1 and 2, the gusset plates shown on the prototype embodiment may include an identifier code, here a sequential numbering, and an identification insignia. This may further include contact information, such as telephone numbers, internet addresses or e-mail addresses, or other information. These may provide a receiving user with an indication of the source of the goods, and may also aid a delivering user bringing the materials. As the stations are identified individually, there is less incentive to steal the station, as it may be identified as stolen, or refused to be refilled.

In accordance with an embodiment of the present invention shown in FIGS. 1 and 2, the delivery station 100 may further include a dispensing lever 150 mounted to a side of the delivery station 100. A chute member 145 may be set within an open portion of the top frame 120, positioned under the top frame 120. The chute member may have a hinged end and a mouth. The chute member may be pivotable at its hinged end which is affixed to the top frame 120. The chute member may be lowered or raised by pivoting the chute member. While lowered, the chute member 145 may form a sloped chute. The dispensing lever 150 may be operated from a side of the delivery station to lower or raise the chute member 145. This side of the delivery station 100 may be referred to as its operation side. The chute member 145 may extend outward to the operation side of the delivery station 100 beyond the edge of the top frame 120.

A delivery station and a storage container according to embodiments of the present invention may be provided to a receiver in a nesting configuration to reduce space occupied in transportation. In a nesting configuration, a delivery station 100 may be fitted over a storage container and slid down such that the legs 130 enclose the storage container. In such embodiments, the legs 130 are spaced apart such that a storage container according to an embodiment of the present invention may fit between the legs. For example, the spacing between the legs 130 may allow a storage container with a 56.5×48 inch base to fit between the legs 130.

After receipt of an initial quantity of a deicing agent or anti-icing agent in one or more storage containers with one or more delivery stations 100 by a receiver at a storage location, generally an outdoor common area, the receiver may deploy a delivery station 100 and set up a storage container with the delivery station 100. The receiver may separate the delivery station 100 from the storage container in their nested configuration, may place the delivery station 100 at a storage location, and may secure the delivery station 100 in place by feet 131. A receiver of anti-icing agents or deicing agents at a facility with a very large area of paved surfaces, such as a shopping mall, may place multiple delivery stations with anti-icing agent storage containers or multiple delivery stations with deicing storage containers at several separate storage locations throughout the facility. The provider may provide the desired number of delivery stations to be located around the receiver's facilities.

A storage container may be lowered onto the top frame 120 of a delivery station 100, where the access side of the storage container and the operation side of the delivery station 100 are aligned. A storage container may be lowered by heavy lifting equipment known to persons of ordinary skill in the art, such as a fork lift, skid steer loader fork lift, or loader lift attachment. If the storage container is an anti-icing agent storage container, a user may open and close a valve of the storage container to control dispensation of an anti-icing agent from the storage container. If the storage container is a deicing agent storage container, the linkage member of the gate member may be fastened to the dispensing lever 150, and a user may operate the chute lever to open and close the gate member and lower and raise the chute member 145 to control dispensation of a deicing agent from the container.

Figure 3:
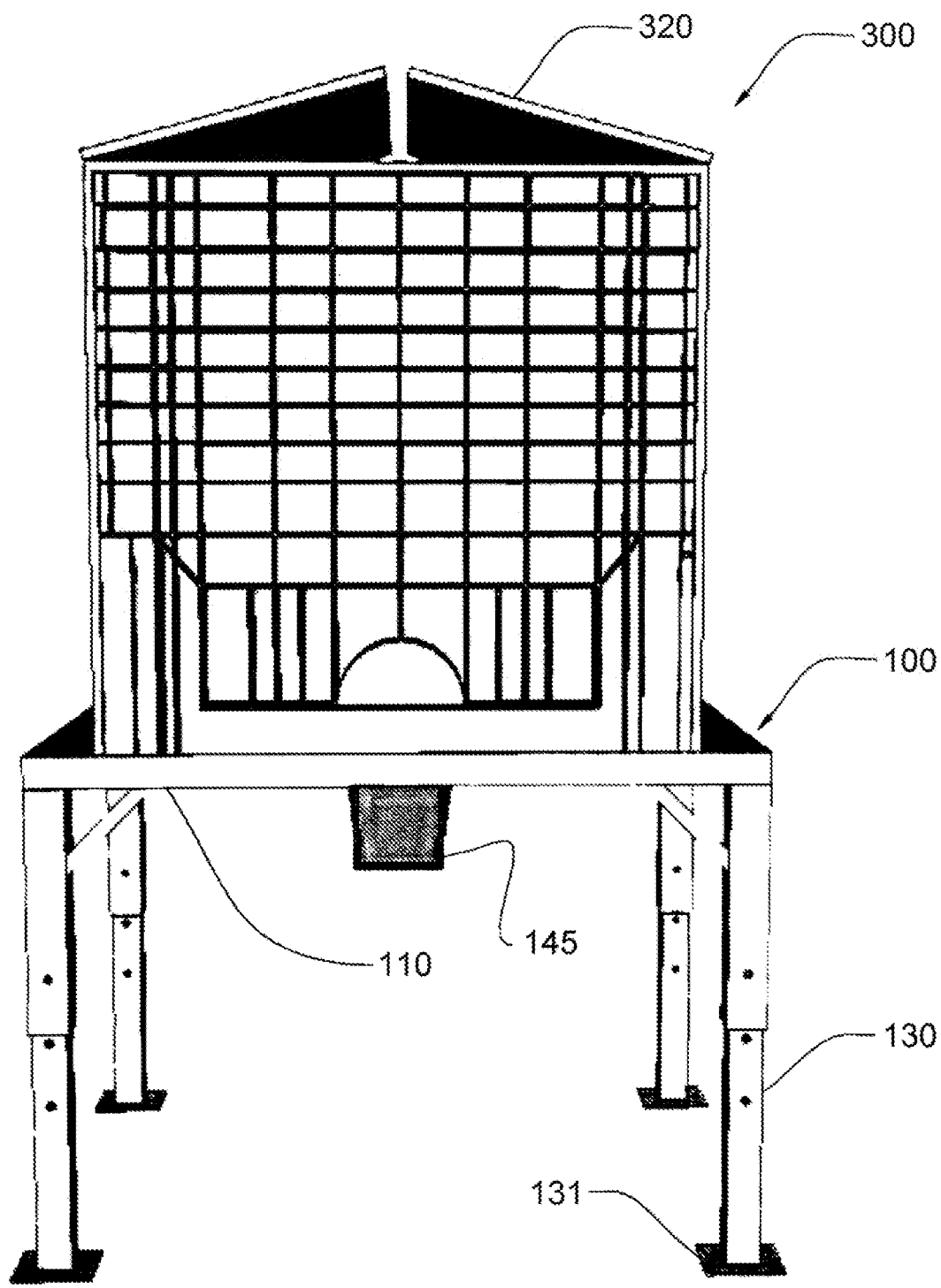
FIG. 3 illustrates a front perspective view of a storage container supported by a delivery station according to an embodiment of the present invention.
Figure 4:
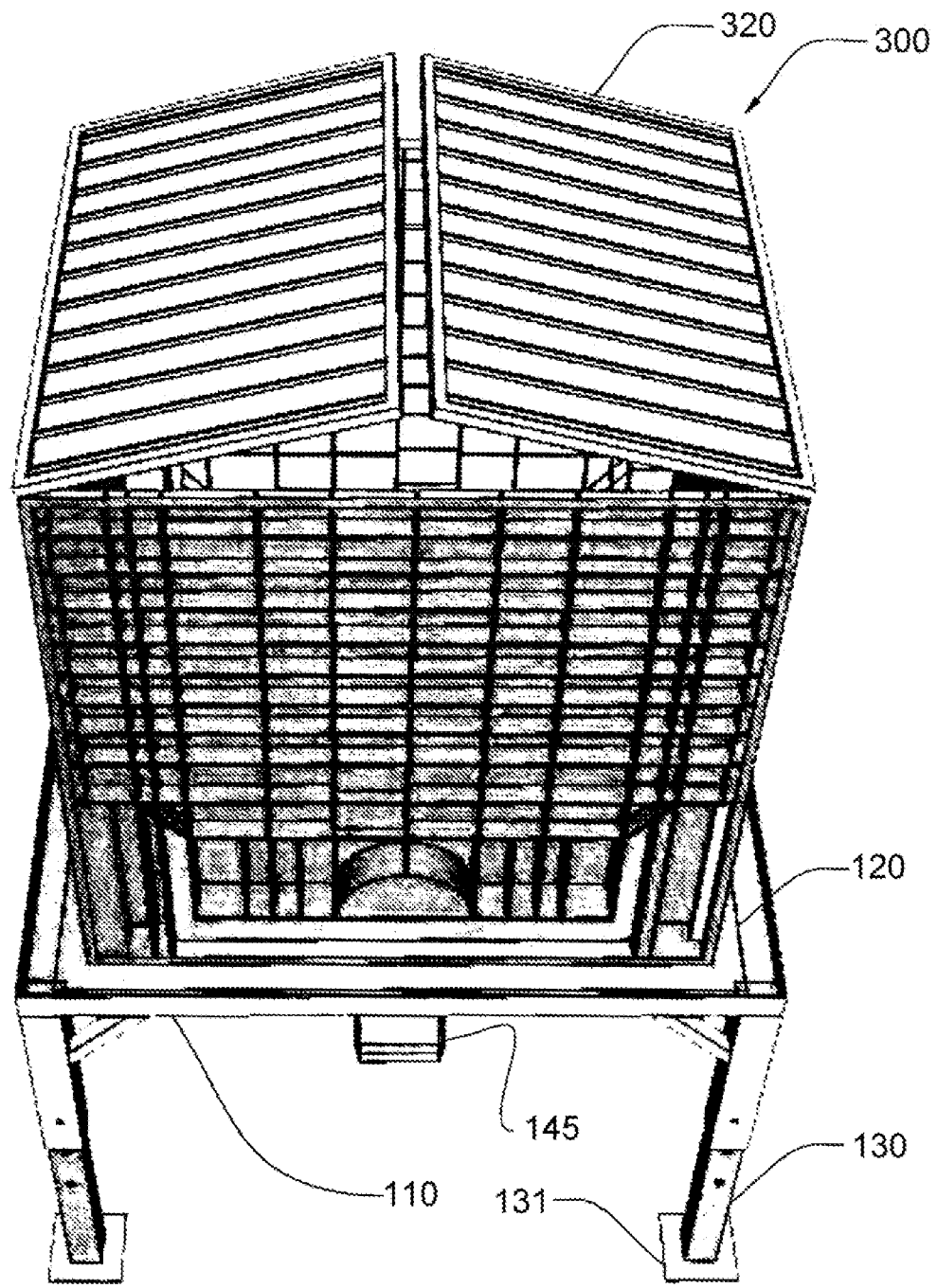
FIG. 4 illustrates a ¾ front perspective view of the storage container supported by a delivery station of FIG. 3 according to an embodiment of the present invention.

Prior to a forecasted snowstorm in the case of anti-icing agents, or following a snowstorm in the case of deicing agents, the receiver may move a sprayer unit as known by persons of ordinary skill in the art in the case of anti-icing agents, or a spreader unit as known by persons of ordinary skill in the art in the case of deicing agents, to the operation side of a delivery station 100. In the case of anti-icing agents, a hose may be connected from the valve of the storage container to the sprayer unit. A sprayer or spreader may be mounted to or towed by a vehicle such as a utility task vehicle (UTV), an all-terrain vehicle (ATV), a truck, a tractor, or any other suitable vehicle. A sprayer or spreader may alternatively manually movable along the ground or manually carryable. In the case of deicing agents, the spreader may be moved such that it is positioned at the operating side of the delivery station 100 and beneath the mouth of the chute member without being positioned directly below the storage container. FIGS. 3 and 4 illustrate an embodiment of the present invention wherein a delivery station supports a container 300, the delivery station having a chute member 145 that directs the dispensation of contents through an outlet of the container toward the front of the station.

Figure 5A:
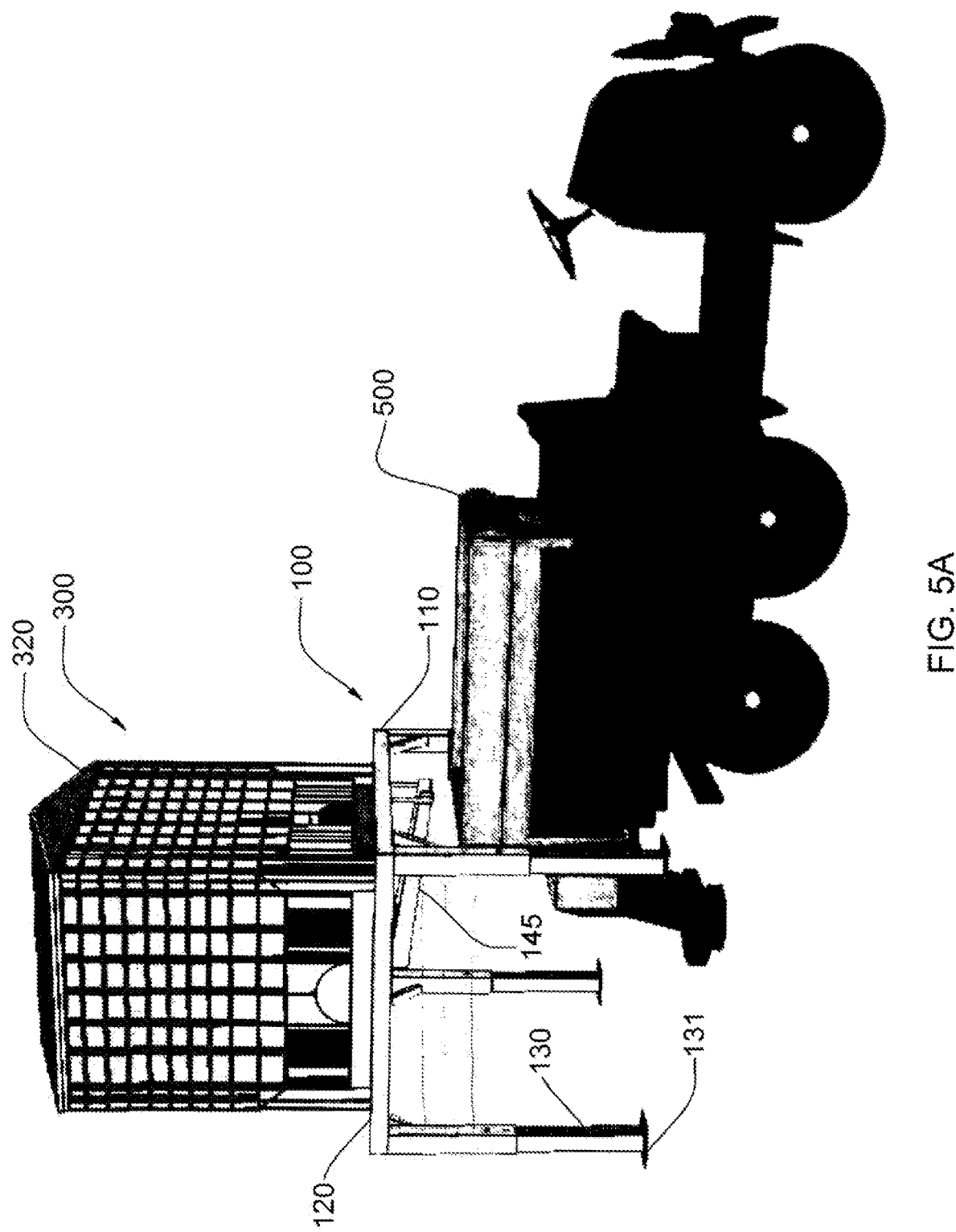
FIG. 5A illustrates a side perspective view of the storage container supported by a delivery station of FIG. 3 in combination with a spreader according to an embodiment of the present invention.
Figure 6:
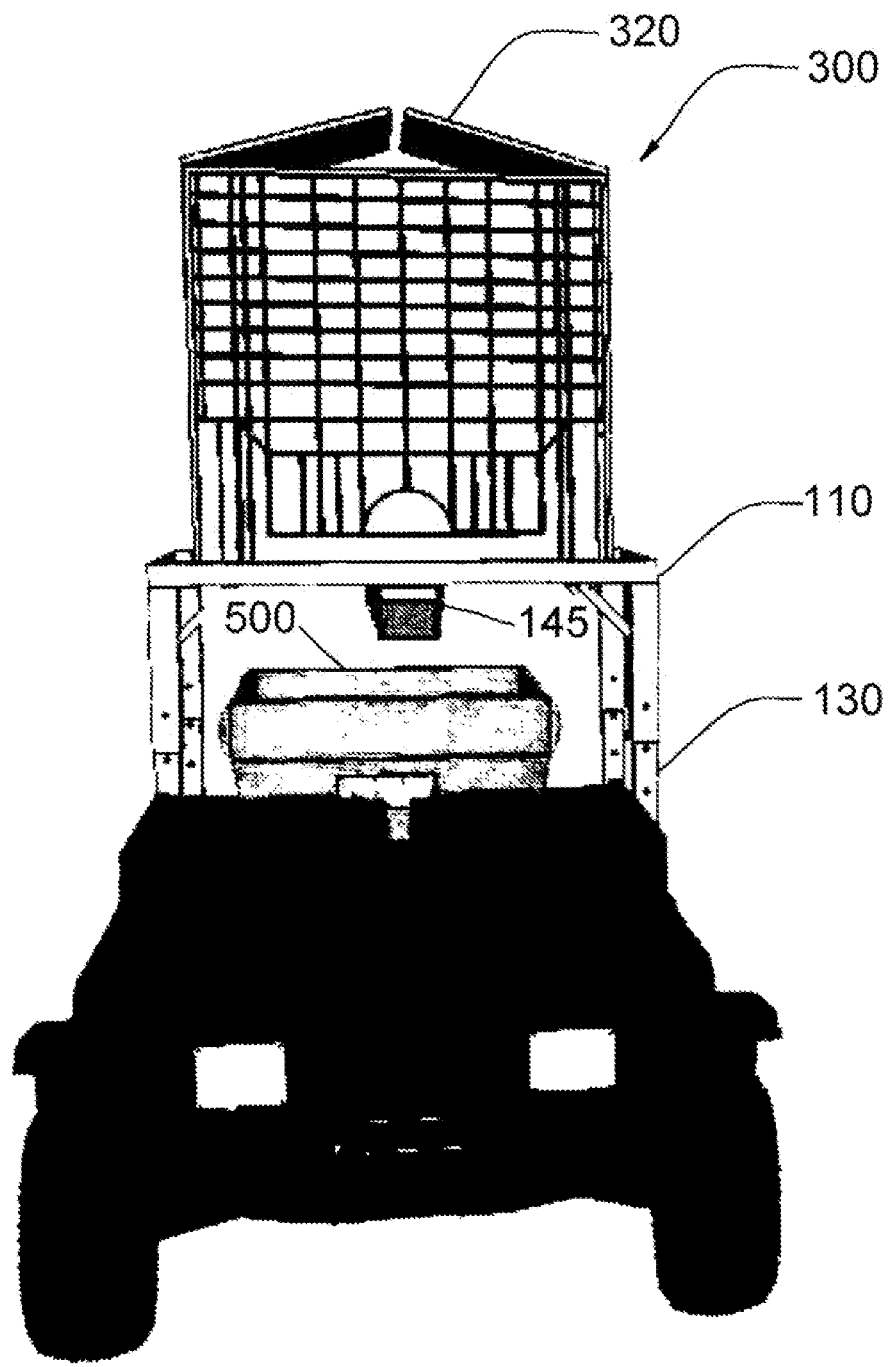
FIG. 6 illustrates a front perspective view of the storage container supported by a delivery station in combination with the spreader of FIG. 5A according to an embodiment of the present invention.
Figure 8:
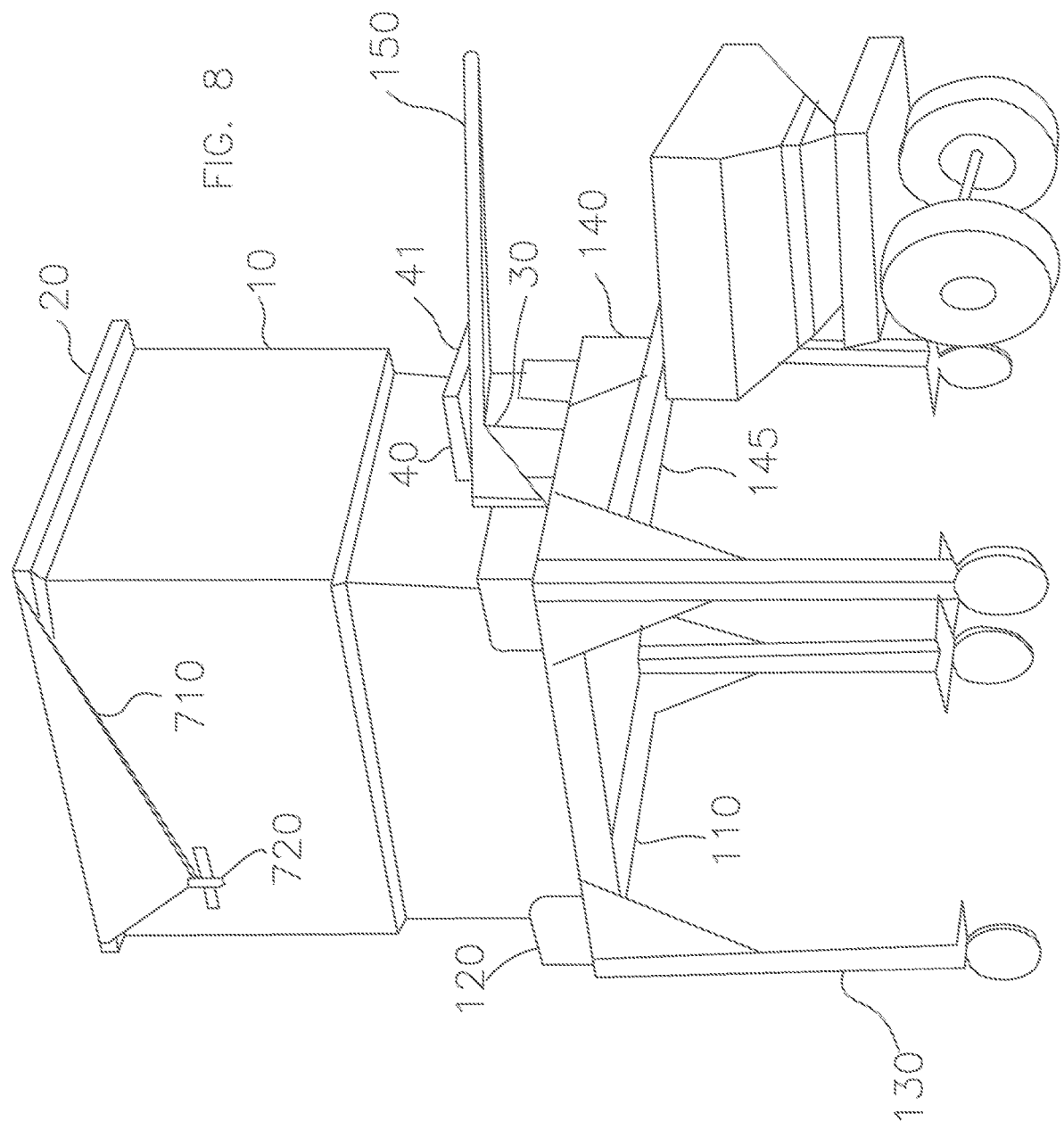
FIG. 8 illustrates dispensing a deicing agent from a storage container according to an embodiment of the present invention.
Figure 9:
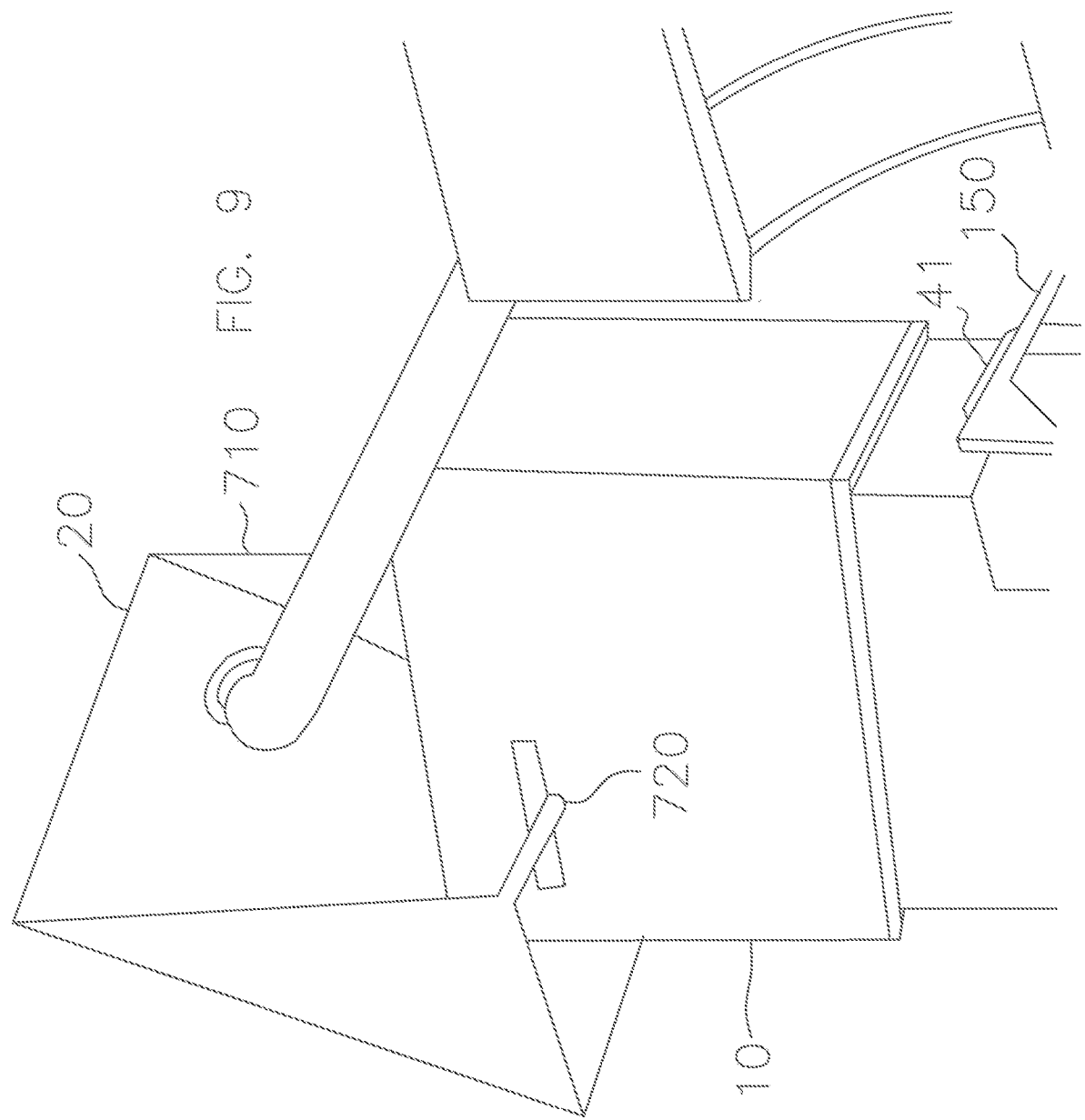
FIG. 9 illustrates refilling a deicing agent into a storage container according to an embodiment of the present invention.
Figure 10:
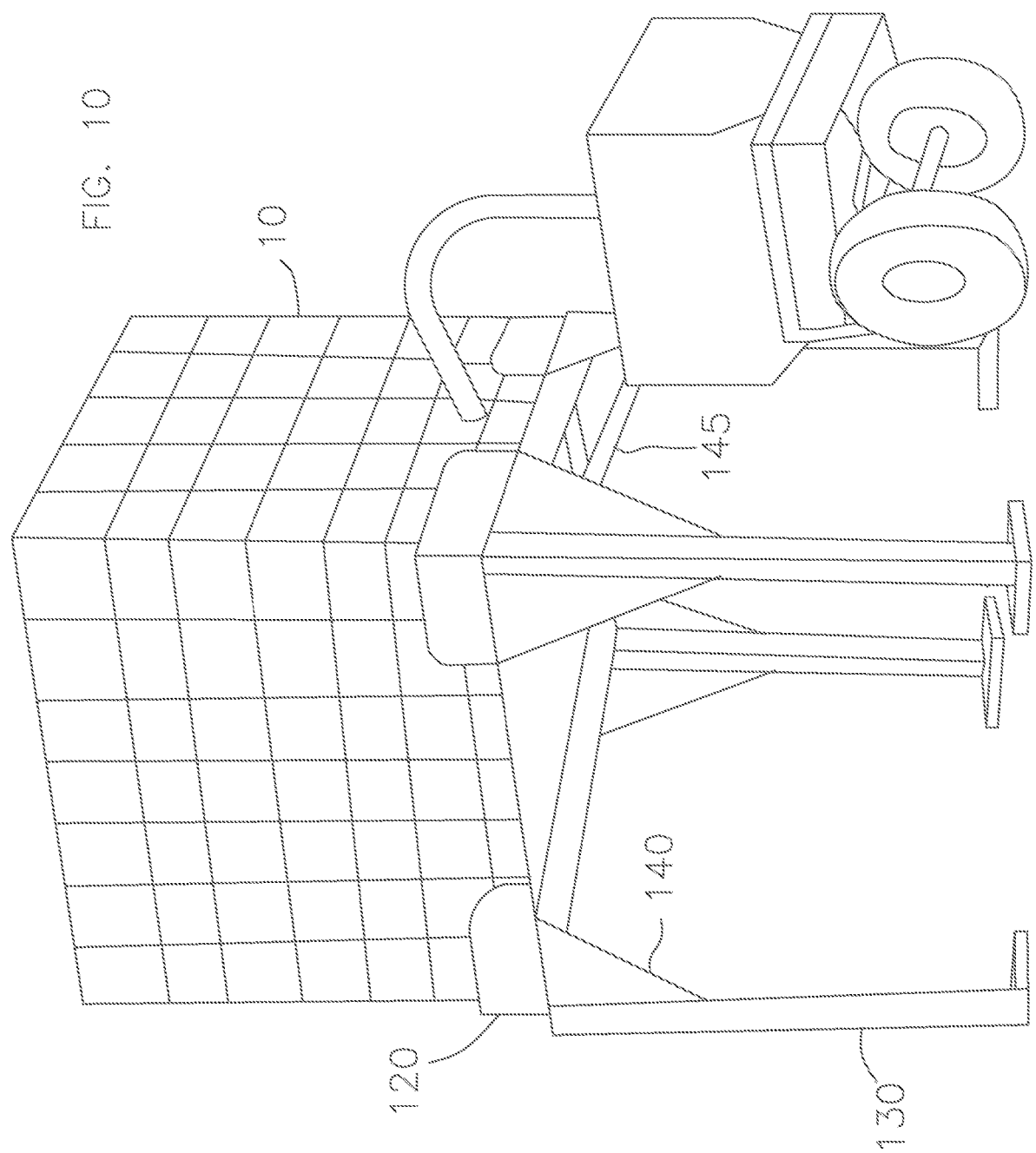
FIG. 10 illustrates dispensing an anti-icing agent from a storage container according to an embodiment of the present invention.
Figure 11A:
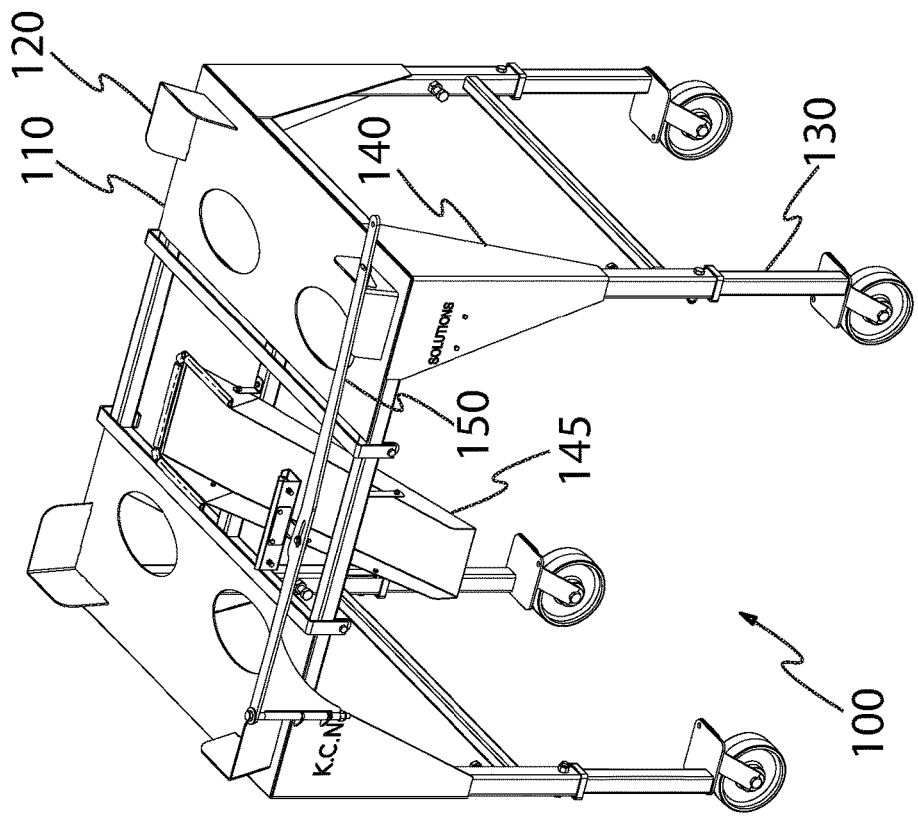
FIGS. 11A and 11B illustrate perspective views of a delivery station according to an embodiment of the present invention.
Figure 11B:
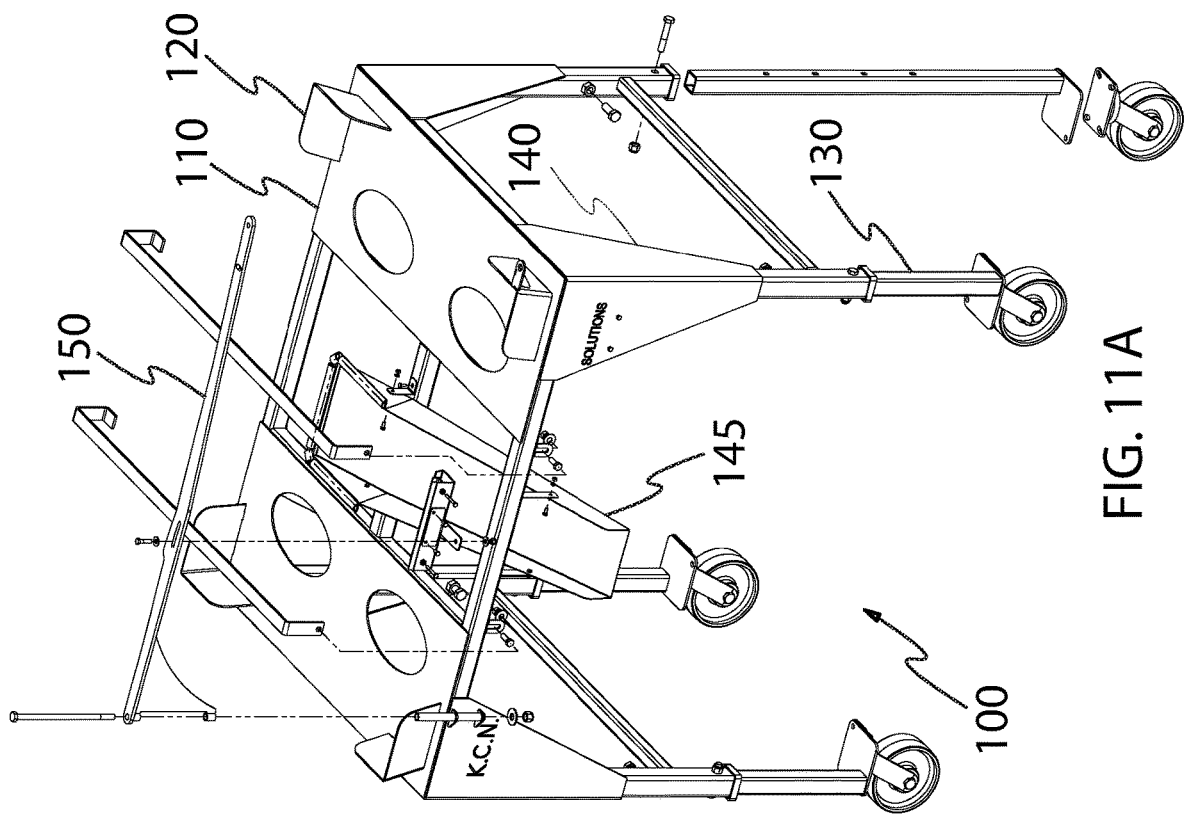

As illustrated in FIG. 8, in the case of deicing agents, the dispensing lever 150 may be operated from the operation side of the delivery station 100 to control the dispensing of deicing agents into a spreader. The positioning of the dispensing lever 150 above the chute member 145 allows the chute operation lever 150 to be accessed clear of the flow of dispensed materials, and without exposing users to the danger of reaching below the storage container. This may facilitate operation during poor conditions, such as outdoor cold, rain, snow, and other environmental issues. The dispensing lever 150 may also include a lock-out mechanism to prevent unauthorized dispensing of the materials by persons other than delivering users. FIGS. 5A, 5B, and 6 illustrate a delivery station supporting a container with a chute member according to an embodiment of the present invention as shown in FIGS. 3 and 4, where the delivery storage directs materials to flow by gravity into a tractor-mounted spreader 500.

Once a sprayer or a spreader has been filled, the sprayer or spreader may be moved from the storage location to a paved surface at the facility. The sprayer or spreader may be operated over an area of the paved surface to apply an anti-icing agent or a deicing agent, respectively, to the paved surface, and continue until empty. Upon emptying the sprayer or spreader, the sprayer or spreader may be moved back to the nearest storage location and filled again.

Upon depletion of some or all of the contents of an anti-icing container or the contents of a deicing container, the receiver may contact the provider to request that the provider replenish the anti-icing agent or the deicing agent. The provider may do so by swapping an emptied storage container for a filled storage container in the case of a non-refillable storage container, or by refilling a storage container in the case of a refillable container.

A provider may arrive at the facility to measure the quantity of an anti-icing agent or a deicing agent depleted, for purposes of recordkeeping and billing. A provider may transport a refill supply of an anti-icing agent or a deicing agent to the facility in a delivery vehicle. This may be accomplished by measuring the quantity of an anti-icing agent or a deicing agent needed to refill the storage container. To weigh the quantity of an anti-icing agent or a deicing agent needed to refill the storage container, a delivery vehicle may be equipped with a scale or load cell to measure a weight difference between the refill supply before and after refilling. The storage container may be provided with a graduated scale such that the interior of the storage container may be viewed while refilling the storage container.

To replenish a supply of anti-icing agent or deicing agent, a storage container may be replaced or refilled by a provider. A raised camera may be used to view the inside of the storage container while refilling in the case of a storage container having a lid. A method for replenishing the containers may be by pumping the anti-icing agent or deicing agent into the container, such as by air powered pumping. Auger driven pumping of the anti-icing agent or deicing agent may also be used. The top of the container may be lockable to prevent persons other than delivering users from filling the containers, or to prevent unauthorized removal of the materials by persons other than delivering users and receiving users.

The transportation of a storage container holding approximately forty to sixty 50-pound units improves the portability of a deicing agent or an anti-icing agent over the transportation of individual 50-pound bags. Storage containers and delivery stations in a nesting configuration may be readily transported in a vehicle such as a trailer or flatbed truck. As storage containers cannot be lifted without the use of machinery, personnel are not exposed to risk of physical injury while loading and unloading storage containers from transport. Furthermore, the transportation of such storage containers provides secure storage by enabling the storage container to be locked to a fixed delivery station.

The dispensation of anti-icing agents and deicing agents from a storage container which can be readily accessed from its side enables personnel employed by the receiver to perform the application of anti-icing agents or deicing agents without engaging in high-risk manual activities such as reaching under the container and manually moving or lifting the container. A delivery station and a storage container according to embodiments of the present invention may have a combined height of 130 inches or more while the legs of the delivery station are extended, so as to discourage accessing the storage container from above and avoiding another potential source of physical injury. The storage of anti-icing agents and deicing agents at a storage location enables the receiver to control the frequency and timing of applications of anti-icing agents or deicing agents over a day, based on local weather conditions and operational variables. This flexibility may enable the receiver to optimize operational variables to improve the efficiency of anti-icing agent or deicing agent usage so as to avoid excessive application or redundant application. The receiver may also plan travel routes for the operation of a sprayer or spreader based on the storage location, thus reducing the travel time to refill a sprayer or spreader.

While particular elements, embodiments, and applications of the present invention have been shown and described, the invention is not limited thereto because modifications may be made by those skilled in the art, particularly in light of the foregoing teaching. It is therefore contemplated by the application to cover such modifications and incorporate those features which come within the spirit and scope of the invention.

What is claimed is:

1. A method of delivering bulk materials to a receiver, comprising:
   a. for a facility, a provider calculating a delivery quantity of at least one of an anti-icing agent and a deicing agent in accordance with an operational variable for the facility;
   b. providing an initial storage container holding a delivery quantity of at least one of an anti-icing agent and a deicing agent to a receiver, wherein the initial storage container is one of a refillable storage container and a non-refillable storage container, and wherein the receiver is an entity that employs personnel responsible for the performance of winter maintenance tasks at the facility;
   c. providing a delivery station to a receiver, wherein the delivery station is transported with the initial storage container in a nested configuration;
   d. the provider receiving a request from the receiver to replenish at least one of an anti-icing agent or a deicing agent;
   e. if a refillable storage container was provided to the receiver, the provider transporting a refill supply of at least one of an anti-icing agent or a deicing agent to a storage location at the facility, wherein a delivery station is positioned at the storage location and an initial storage container holding less than a delivery quantity of an anti-icing agent is supported by the delivery station, and pumping the anti-icing agent or deicing agent from the refill supply into the initial storage container, while measuring the quantity of the refill supply that is expended to refill the initial storage container;
   f. if a non-refillable storage container was provided to the receiver, the provider transporting a replacement storage container holding a delivery quantity of an anti-icing agent or a deicing agent to a storage location at the facility, wherein a delivery station is positioned at the storage location and an initial storage container holding less than a delivery quantity of an anti-icing agent is supported by the delivery station, and replacing the initial storage container with the replacement storage container.

2. The method of claim 1, wherein the delivery quantity is measured in 50-pound units.

3. The method of claim 2, wherein the delivery quantity is within a range of approximately forty to sixty 50-pound units.

4. The method of claim 1, wherein the operational variable is a past delivery quantity measured in 50-pound units.

5. The method of claim 1, wherein the storage container holding the delivery quantity of at least one of the anti-icing agent and the deicing agent further comprises a valve opening through a side of the storage container.

6. The method of claim 1, wherein the storage container holding the delivery quantity of at least one of the anti-icing agent and the deicing agent further comprises an outlet opening near a base of the storage container covered by a gate member, wherein the gate member is attached to a linkage member.

7. The method of claim 1, wherein a refillable storage container is provided to the receiver with a lid of the refillable storage container pivotably affixed to the initial storage container by a cradle mechanism.

8. The method of claim 1, wherein a non-refillable storage container is provided to the receiver with a lid of the refillable storage container secured to the initial storage container by a lock.

9. The method of claim 1, wherein the delivery station has a dispensing lever mounted to a side and a chute member, and an initial storage container at the storage location has an outlet opening near a base of the storage container covered by a gate member, wherein the gate member is attached to a linkage member; and the linkage member is fastened to the dispensing lever such that the dispensing lever is operable to open and close the gate member and lower and raise the chute member such that contents of the storage container may be dispensed through the gate member while the gate member is opened and flow through the chute member while the chute member is lowered.

10. The method of claim 9, wherein the initial storage container and the delivery station are configured such that the outlet of the initial storage container, the chute member, and the dispensing lever face the same direction, and the dispensing lever is configured above the chute member such that it is operable clear of the flow path of contents from the initial storage container through the chute.

11. The method of claim 1, wherein providing the initial storage container takes place prior to a winter season, and refilling or replacing the initial storage container takes place during a winter season following a winter storm.

12. The method of claim 1, wherein a deicing agent is a salt compound treated with an additive which reduces bridging of salt granules.

13. The method of claim 1, wherein the delivery station is stationary, comprising feet having anchor holes for bolting the feet to a ground or floor surface.

14. The method of claim 1, wherein the delivery station further comprises a wheeled base.

* * * * *